US007849320B2

(12) United States Patent
Raikar et al.

(10) Patent No.: US 7,849,320 B2
(45) Date of Patent: Dec. 7, 2010

(54) METHOD AND SYSTEM FOR ESTABLISHING A CONSISTENT PASSWORD POLICY

(75) Inventors: Amit Raikar, Sunnyvale, CA (US); Guruprasad Ramarao, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1936 days.

(21) Appl. No.: 10/723,119

(22) Filed: Nov. 25, 2003

(65) Prior Publication Data

US 2005/0114673 A1    May 26, 2005

(51) Int. Cl.
G06F 21/00 (2006.01)
H04L 29/06 (2006.01)
(52) U.S. Cl. .......................................... 713/182; 726/1
(58) Field of Classification Search ........................ None
See application file for complete search history.

(56) References Cited

U.S. PATENT DOCUMENTS

| 2002/0161707 A1* | 10/2002 | Cole et al. ..................... 705/42 |
| 2003/0065942 A1* | 4/2003 | Lineman et al. ............. 713/201 |
| 2004/0068650 A1* | 4/2004 | Resnitzky et al. ........... 713/155 |
| 2004/0250141 A1* | 12/2004 | Casco-Arias et al. ........ 713/202 |

* cited by examiner

Primary Examiner—Brandon S Hoffman

(57) ABSTRACT

Methods and systems for establishing a consistent password policy. A plurality of password policies is described in a computer usable password policy data structure. The computer usable password policy data structure is accessed by a password policy enforcement agent. Optionally, the computer usable password policy data structure is validated for authenticity by the password policy enforcement agent. Optionally, the password policy enforcement agent can report back to a centralized configuration and aggregation point repository in order to provide a consistent view of policy enforcement.

22 Claims, 2 Drawing Sheets

METHOD AND SYSTEM FOR ESTABLISHING A CONSISTENT PASSWORD POLICY

TECHNICAL FIELD

Embodiments of the present invention relate to methods and systems for establishing a consistent password policy.

BACKGROUND ART

The use of passwords is one of the most common techniques of authenticating users to computer systems. Traditionally, passwords play a central role in securing such systems. Unfortunately, passwords are generally one of the easiest security mechanisms to defeat.

One of the factors influencing the strength or robustness of a password authentication mechanism is the strength of the password itself. For example, many "easy to remember" passwords, e.g., a person's birth date or favorite color, can generally be easily determined by an adversary. Other common passwords are susceptible to dictionary-based attacks, e.g., an automated program attempts all of the words in a dictionary as a password. The conventional art is replete with methods to enhance the security of password-based authentication. For example, "strong" passwords, e.g., passwords that are difficult to guess, can be created by automated software and provided to users.

Unfortunately, due in part to the complexity of password based access control, and influenced by the myriad techniques available to enhance such controls, the realization of password based access controls is frequently a hodge-podge of policies implemented inconsistently across a computing environment, e.g., an enterprise computing system. For example, a director of information technology may decree that certain password-related policies are to be used within an enterprise. However, there is generally not a method or system for effectively distributing, enforcing and implementing such policies throughout the enterprise. For example, implementation and enforcement of such policies is often left to various individual system administrators having physical control of different computing assets.

Thus a need exists for methods and systems for establishing a consistent password policy. A further need exists for establishing a consistent password policy in enterprise scale computer systems. A still further need exists to meet the previously identified needs in a manner that is complimentary and compatible with conventional computer system operations.

SUMMARY OF THE INVENTION

Embodiments of the present invention provide for establishing a consistent password policy. Further embodiments of the present invention provide for establishing a consistent password policy in enterprise scale computer systems. Still further embodiments of the present invention meet the previously identified need in a manner that is complementary and compatible with conventional computer system operations.

Accordingly, methods and systems for establishing a consistent password policy are described. A plurality of password policies is described in a computer usable password policy data structure. The computer usable password policy data structure is accessed by a password policy enforcement agent. Optionally, the password policy enforcement agent validates the computer usable password policy data structure for authenticity. At least one of the plurality of password policies described within the password policy data structure is enforced by the password policy enforcement agent. Optionally, the password policy enforcement agent can report back to a centralized configuration and aggregation point repository in order to provide a consistent view of policy enforcement.

BEST MODES FOR CARRYING OUT THE INVENTION

In the following detailed description of the present invention, method and system for establishing a consistent password policy, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., process 200) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "dividing" or "computing" or "testing" or "calculating" or "determining" or "storing" or "displaying" or "recognizing" or "generating" or "performing" or "comparing" or "synchronizing" or "accessing" or "retrieving" or "conveying" or "sending" or "resuming" or "installing" or "gathering" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and System for Establishing a Consistent Password Policy

Figure 1:
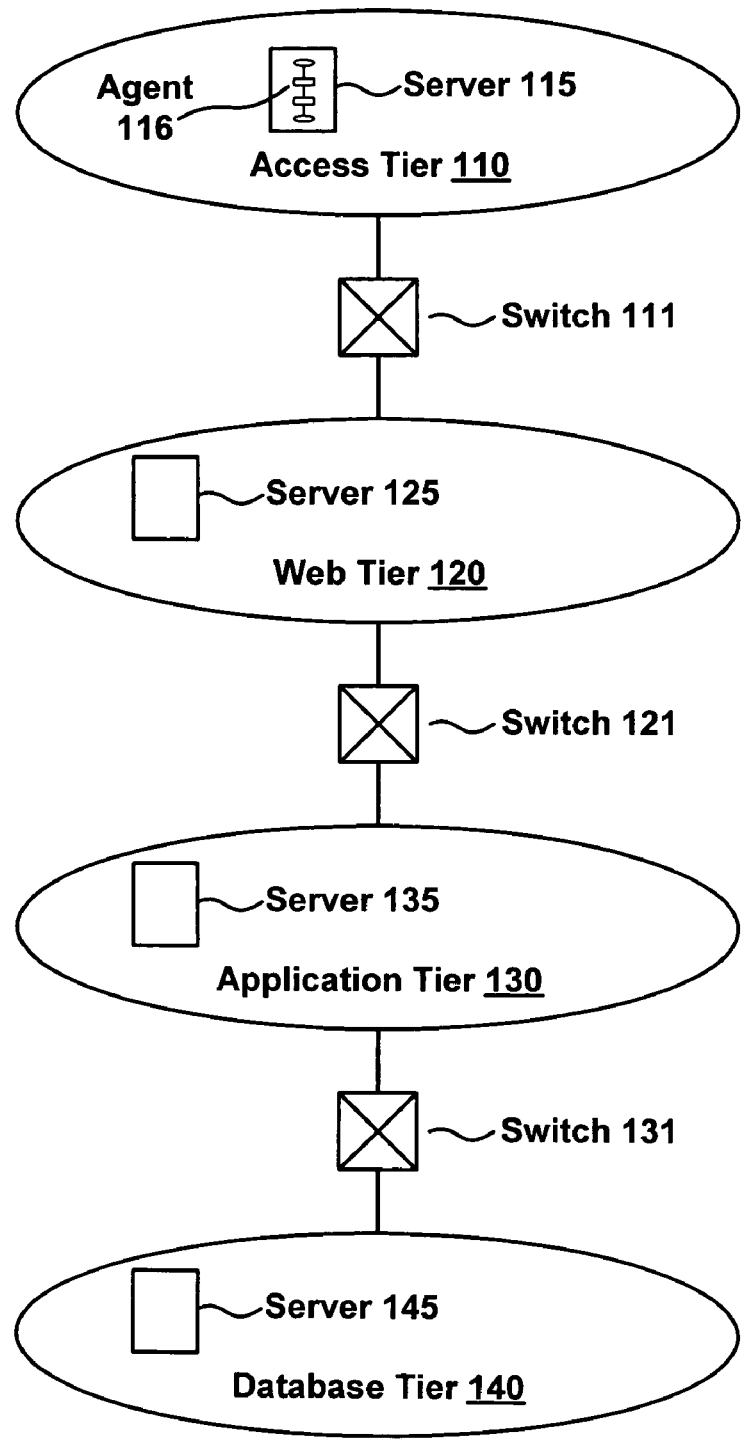
FIG. 1 illustrates an exemplary utility data center which may form a platform for implementing password policies, in accordance with embodiments of the present invention.

FIG. 1 illustrates an exemplary utility data center which may form a platform for implementing password policies, in accordance with embodiments of the present invention. Utility data center 100 comprises four tiers, an access tier 110, a web tier 120, an application tier 130 and a database tier 140. It is to be appreciated that a utility data center can comprise fewer or different tiers.

The database tier 140 is generally populated with a variety of storage devices and architectures, including storage area networks (SAN). Streaming tape, different categories of redundant arrays of independent disks (RAID), various snapshot technologies and storage appliances can be used to populate database tier 140. Database tier 140 further comprises a plurality of server computer systems, e.g., server 145.

High speed switches, e.g., switch 131, link the database tier 140 to the application tier 130. This linking enables processing to be linked to data in a flexible, dynamic manner. Some application software can be installed at this layer, for example, enterprise resource planning (ERP) core systems. In general, most user applications, for example web servers, execute on the application tier 130. Application tier 130 further comprises a plurality of server computer systems, e.g., server 135.

Similarly, high speed switches, e.g., switch 121, link the application tier 130 to the web tier 120. Access to applications is managed uniformly with standard markup languages such as hypertext markup language (HTML) and extensible markup language (XML). Generally, network attached storage (NAS) appliances assist in the storage and caching of data for the application layer.

Web tier 120 comprises additional servers and storage to allow users to browse Web pages containing the information that they need. High speed switches, e.g., switch 111, link the web tier 120 with access tier 110. The access layer is where basic security functionality resides. For example, the data center side of virtual private networks (VPNs), authentication and authorization repositories and intrusion detection systems reside in the access tier 110. Password access is generally handled at access tier 110. Web tier 120 and access tier 110 further comprises a plurality of server computer systems, e.g., server 125 and server 115.

While a utility data center offers great flexibility and efficiency, establishing and implementing a consistent password policy within such a utility data center is highly complex. For example, access tier 110 can comprise a variety of server computers, including, for example, differing processor architectures running different operating systems. In general, such different types of systems implement a variety of password authentication techniques. In addition, often times such computer systems are geographically dispersed, and can even operated in different language. Such factors make it difficult to consistently apply a set of password policies across many diverse access points.

In general, it is desirable to implement policies intended to strengthen access passwords in a uniform, consistent manner across large computer systems. The conventional art does not provide a means to consistently apply password policies throughout such large computer systems, e.g., an enterprise computing system or the utility data center of FIG. 1. Several examples of such policies will now be described.

A first method of enhancing password-based access control is to disable access after a predetermined number of unsuccessful access attempts. For example, after five unsuccessful attempts at entering the correct password, access is denied to all subsequent attempts, even if the correct password is subsequently utilized. Generally, this method denies access, or "locks" access, to an account after a predetermined number of continuous unsuccessful attempts, with consideration of time, e.g., time between attempts or elapsed time between a first attempt and a subsequent lock-triggering attempt. After access is locked, intervention from a system administrator is required to enable the account. Advantageously, requiring system administrator intervention servers to automatically inform the system administrator of the attack, enabling additional account monitoring or other defensive measures.

Unfortunately, this method is less than desirably robust as an attacker can easily determine the threshold limit for the allowed number of incorrect attempts. The threshold can be a system default behavior, or the attacker can count the number of attempts until lockout occurs. Utilizing threshold information, an attacker can evade such lock out mechanisms by pacing a number of attempts below the threshold in between successful accesses by a legitimate user.

It is to be appreciated that disabling access after a predetermined number of unsuccessful access attempts can be utilized as a denial of service (DOS) attack. For example, rather than clogging a system's network access, user access can be denied by making a number of invalid access attempts that is sufficient to lock the account. This vulnerability should be carefully weighed prior to implementation and configuration of this password protection feature.

A different method of enhancing password-based access control is to utilize an increasing delay after each failed access attempt. For example, a first time interval is required after a first unsuccessful access attempt before a second access attempt is allowed. If a second access attempt is unsuccessful, then a second time interval, longer than the first time interval, is required before a third access attempt is allowed, and so on. Embodiments in accordance with the present invention are well suited to a wide variety of methods to increase a delay time, e.g., additive, geometric and exponential time increases. An enhancement to this method is to reset the delay to the lowest value after a successful authentication (login).

Another method of enhancing password-based access control is to enforce the use of high quality, strong passwords. In the case of a client-server architecture with thin browse clients, the validation of the quality of passwords should be implemented on the client side, for example using a scripting language, e.g., JavaScript, to enable a desirably rapid response to the user. For example, at the time of password initialization or re-initialization, a user should receive effectively immediate response as to the acceptability of a chosen candidate password. However, these policies should also be enforced utilizing server side implementations, for example subsequent to client-side processing, so as to ensure that the policies are enforced for clients lacking a suitable scripting language as well as to prevent any script-language related vulnerabilities.

Yet another method of enhancing password-based access control is to automatically generate and provide strong passwords to a user. Various rules or policies to create strong passwords are well known, for example, enforcing a minimum and maximum password length. A minimum password length increases the permutations required for brute force attacks, while a maximum password length helps to defeat/avoid buffer overflow attacks. Other policies can include requiring the user of a case-sensitive password comprising an upper and/or lower case character, requiring a numeric character, requiring a special, non-alphabetic and non-numeric character, e.g., "#," requiring that a password is not a word from the common language or other natural language(s), requiring that a password is not a palindrome and requiring that a password is not a derivative of the login or account name and the like. Embodiments of the present invention are well suited to these and other policies utilized to create strong passwords.

Still another method of enhancing password-based access control is to implement a scheme of password aging. In general, the longer a password is in use, the longer that an attacker has to sniff and/or guess the password. Consequently, a password used for a long time may be considered to be weak and unsafe. It is therefore desirable to enforce a password age limit that would automatically disable a password after a pre-determined lifetime. For example, after the expiration of the password lifetime, the user can be required to change the password before being allowed access to the computer system. In general, password changing operations should be authenticated with the immediately prior valid password.

A password with an assigned lifetime can be assigned to one of three states. Either the password is "alive," "expired," or the password is "dead." An "alive" password is valid for user account authentication. For example, the password has not reached its pre-determined lifetime. An "expired" password has reached its pre-determined lifetime. In general, the user will receive a message indicating a requirement to change the password. The expired password remains valid only for the purposes of authenticating a password change. A "dead" password is completely invalid. A password should be declared dead after a relatively short time interval, e.g., one week, has elapsed since the password expired. The time interval provides a reasonable period during which a user may typically be expected to attempt a log in, and thus receive notification that the password has expired. When a password becomes dead, a user should not be given an option of changing the password. At this time, only system administrators should reactivate the account. Declaring passwords dead helps ensure that long dormant accounts do not become attractive targets for malicious attacks.

Still yet another method of enhancing password-based access control is to enforce a password history requirement. It is common for users to utilize passwords from a pool of a few easily remembered passwords. For example, after password "A" has expired, the user changes to password "B." After password "B" expires, the user desires to change back to password "A." Such repeated usage of passwords decreases the strength of the password, especially if the password is reused within a short period of time. Repeated use of passwords is, in reality, a form of using a password for a long time. As discussed previously, the longer a password is in use, the more time that an attacker has to sniff and/or guess the password. Additionally, a user may inadvertently reuse a password which has previously been compromised, or was suspected of being compromised. A password history policy typically requires that none of the last n passwords for an account can be used as the next password, where n is a configuration parameter selected by a system administrator.

Another method of enhancing password-based access control is to perform checks on the strength of existing passwords. For example, password "cracking" software is commonly available. Such software should be run by system administrators to test the strength of existing passwords. If a password is defeated by such an in-house attack, it should be changed. For example, it can be marked as "expired" as described previously. Advantageously, such in-house attacks can identify password policy weaknesses, allowing an opportunity to correct/update the policy set prior to widespread damage.

As previously discussed, the conventional art does not provide a means to consistently apply these policies throughout a large computer system, e.g., an enterprise computing system or the utility data center of FIG. 1.

In accordance with embodiments of the present invention, such password policies can be specified in a computer usable data structure, e.g., an extensible markup language (XML) file. Such a data structure can be created by a central authority, e.g., a director of information technology, and distributed to access points of a far flung computing environment, e.g., access tier 110 of FIG. 1. A password policy enforcement agent, e.g., a software program or set of programs, resident within such access points is operable to access the password policies from the data structure and implement them. Referring to FIG. 1, in accordance with embodiments of the present invention, server 115 of access tier 110 comprises a password policy enforcement agent 116. In this novel manner, the distribution and enforcement, system wide, of a single set of password policies can be automated, providing a beneficial improvement in the consistency of password policies through a computing environment.

The overall framework for implementing password policies can be broken down into a client-server architecture. For example, the server would typically be the policy configuration and aggregation point, while the clients would generally be the enforcement points. The server can either push a password policy data structure to the access points, or it can make a password policy data structure available to the access points for pull access.

Figure 2:
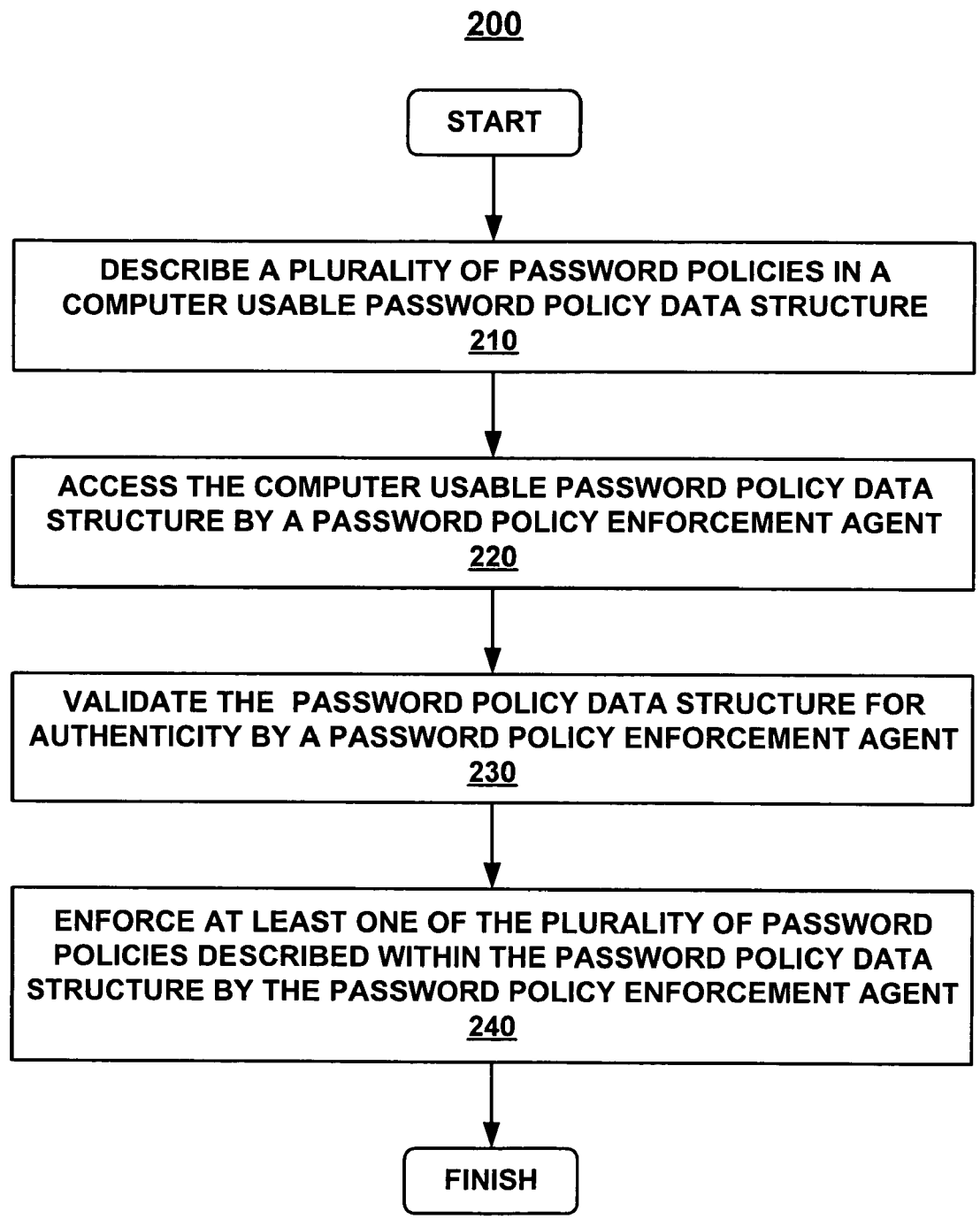
FIG. 2 illustrates a flow chart for a method 200 of establishing a consistent password policy, in accordance with embodiments of the present invention.

FIG. 2 illustrates a flow chart for a method 200 of establishing a consistent password policy, in accordance with embodiments of the present invention.

In block 210, a plurality of password policies is described in a computer usable password policy data structure. An extensible markup language (XML) file will be illustrated as an exemplary password policy data structure. It is to be appreciated that embodiments in accordance with the present invention are well suited to other types of computer usable data structures.

The password policy data structure comprises a list of parameters to be utilized in conjunction with an XML style sheet. The XML style sheet describes the password policy to the enforcement points, e.g., clients of a client-server computer system.

Exemplary parameters are described in the following material. In order to implement a policy to disable access after a predetermined number of unsuccessful attempts, an XML password policy file contains a threshold parameter that specifies the number of unsuccessful access attempts allowed prior to disabling access. Optionally, an XML password policy file can additionally contain a parameter indicating a time duration, e.g., a number of hours, within which the threshold triggers the locking of an account. In addition, a parameter should be included to identify a number of incorrect login attempts at which point a notification will be sent to a computer system security authority, e.g., a computer system security manager. This notification parameter should be set to be not greater than the threshold parameter.

In order to implement a policy to utilize an increasing delay after each failed access attempt, an XML password policy file can contain an initial delay parameter, typically specified in seconds. In order to implement a policy of enforcing the use of high quality, strong passwords, an XML password policy file contains a numerical indication of required password characteristics. For example, in order to require the use of three upper case alphabetical characters in a password, the password policy file comprises a statement, "upper case alphabetical characters=3". Similar statements should be included for all password characteristics, for example listing requirements for number of lower case alphabetical characters, number of numeric characters and number of special characters (non-alphabetic and non-numeric). Specifying a parameter as zero (0) would indicate that a particular type of character is not required. Using zero as a parameter, rather than not listing a character type, advantageously maintains the list of character types and password requirements within the data structure for consistency, documentation and other purposes.

In order to implement policies related to length requirements for an allowable password, a password policy data structure should comprise parameters for minimum and maximum password lengths.

In order to implement policies related to other aspects of password composition, a true/false parameter can be included in a password policy data structure to identify such requirements. For example, to prevent the use of an English language word as a password, a statement similar to "Allow English word=False" can be included in the data structure. Similar statements should be included to allow or disallow use of palindromes, derivatives of login or account names, and other or all natural languages.

In order to implement a policy that generates a strong password for a user, the password generation program should refer to password requirements within a password policy data structure that have been discussed previously. For example, if a password policy file comprises a statement of the form "upper case alphabetical characters=3," then the password generation program should not generate passwords that do not meet such requirements.

In addition, there are a number of types of passwords that could be automatically generated. For example, an automatically generated password could comprise a pronounceable sequence of pseudo-random letters or phonemes, e.g., "qUiScH." It is to be again appreciated that a password generation program should not generate passwords that do not comply with password policies specified by a password policy file, e.g., "Allow English word=False." Alternatively, an automatically generated password could comprise a sequence of random characters drawn from the alphabetic letters. Another variation is to create a password comprising a sequence of random characters drawn from the alphabetic letters and numeric characters. Yet another variation is to create a password comprising a sequence of random characters drawn from all symbols available on a keyboard, e.g., including "<{[(~)]}>." Such options for control of automatic password generating functions should be included within a password policy data structure. For example the statement "Automatically generate password=Yes, password type=3" identifies a particular set of requirements, e.g., a password comprising a sequence of random characters drawn from all symbols available on a keyboard.

In order to implement policies related to password aging, a password policy data structure should comprise parameters for password lifetime and time interval after expiration available for a user to change the password.

In order to implement policies related to password reuse, a password policy data structure should comprise a numeric parameter for how many passwords to store, and thus how many times a password must be changed prior to reuse.

The policy creation point, e.g., a server on an application tier 130 (FIG. 1) controlled by the director of information technology, would generally populate the password policy data structure for different clients using a non-discretionary group based access control model, either in a standalone fashion of as a subsystem for the overall enterprise-wise security policy engine.

Still referring to FIG. 2, in block 220, the password policy data structure is accessed by a password policy enforcement agent, e.g., password policy enforcement agent 116 of FIG. 1. Optionally, the password policy data structure can be encrypted and/or signed by the server. In such a case, password policy enforcement agents would verify the authenticity of the password policy data structure prior to implementation. The client may utilize a centralized service, e.g., XML Key Management System (XKMS) to offload the digital signature verification.

In optional block 230, the password policy data structure is validated for authenticity by the password policy enforcement agent, e.g., by well-known digital signature verification techniques.

In block 240, a password policy indicated within the password policy data structure is enforced by a password policy enforcement agent.

In optional block 250, the password policy enforcement agent provides feedback to the configuration and aggregation point, about which policies it has been successful in enforcing. The feedback can be provided in a number of manners, for example, by modifying the password policy data structure that had been used for parsing the policy, and signing the data structure so that the configuration and aggregation point can later validate the feedback to be from the specific policy enforcement point. Such a feedback technique is useful when a enforcing a flexible policy, for example, a policy of satisfying a subset, e.g., a minimum number, of the plurality of password policies described within the password policy data structure. Beneficially, such feedback provides a consistent view of the policy enforcement.

In optional block 260, the password policy feedback data structure sent by the password policy enforcement agent is validated for authenticity by the configuration and aggregation point, e.g., by well-known digital signature verification techniques. This block is only used in conjunction with optional block 250.

Embodiments of the present invention provide for establishing a consistent password policy. Further embodiments of the present invention provide for establishing a consistent password policy in enterprise scale computer systems. Still further embodiments of the present invention meet the previously identified need in a manner that is complementary and compatible with conventional computer system operations.

Embodiments in accordance with the present invention, method and system for establishing a consistent password policy, are thus described. While the present invention has been described in particular embodiments, it should be appreciated that the present invention should not be construed as limited by such embodiments, but rather construed according to the below claims.

What is claimed is:

1. A computer implemented method of establishing a consistent password policy, said method comprising:

describing a plurality of password policies in a computer usable password policy data structure;

accessing said computer usable password policy data structure by a password policy enforcement device;

enforcing at least one of said plurality of password policies described within said password policy data structure by said password policy enforcement device;

determining a strength of one of said plurality of password policies based on said enforcing; and dynamically modifying one of said plurality of password policies based on said strength.

2. The computer implemented method of claim 1 wherein said computer usable password policy data structure comprises a file structure compatible with extensible markup language.

3. The computer implemented method of claim 1 wherein said password policy enforcement device is operable on a client computer of a client-server computer system.

4. The computer implemented method of claim 1 wherein said method is operable on a utility data center.

5. The computer implemented method of claim 1 further comprising validating said computer usable password policy data structure for authenticity by said password policy enforcement device.

6. The computer implemented method of claim 1 wherein said plurality of password policies comprises a threshold parameter for unsuccessful access attempts that when exceeded disables a computer system access account.

7. The computer implemented method of claim 6 wherein said plurality of password policies comprises a parameter indicating a time duration, and wherein exceeding said threshold parameter triggers locking of a computer system access account within said time duration.

8. The computer implemented method of claim 1 wherein said plurality of password policies comprises an initial delay parameter to block access to a computer system access account for a period of time after an unsuccessful access attempt.

9. The computer implemented method of claim 8 wherein access to said computer system access account is delayed for an increasing time period for successive unsuccessful access attempts.

10. The computer implemented method of claim 1 wherein said plurality of password policies comprises a minimum password length parameter.

11. The computer implemented method of claim 1 wherein said plurality of password policies comprises a maximum password length parameter.

12. The computer implemented method of claim 1 wherein said plurality of password policies comprises a parameter for prohibiting passwords comprising a word associated with a natural language.

13. The computer implemented method of claim 12 wherein said natural language is English.

14. The computer implemented method of claim 1 wherein said plurality of password policies comprises a parameter for prohibiting passwords comprising a palindrome.

15. The computer implemented method of claim 1 wherein said plurality of password policies comprises a parameter for prohibiting passwords comprising a derivative of a computer system account name.

16. The computer implemented method of claim 1 wherein said plurality of password policies comprises a parameter for automatically generating a password.

17. The computer implemented method of claim 1 wherein said plurality of password policies comprises a parameter for automatically generating a pronounceable password consistent with said plurality of password policies.

18. The computer implemented method of claim 1 wherein said plurality of password policies comprises a parameter for specifying a set of characters utilizable to automatically generate a password.

19. The computer implemented method of claim 1 further comprising providing, by said password policy enforcement device, feedback to a configuration and aggregation point, about whether said at least one of said plurality of password policies has been successfully enforced.

20. Instructions on a computer usable storage device wherein the instructions when executed cause a computer system to perform a method of establishing a consistent password policy, said method comprising:

describing a plurality of password policies in a computer usable password policy data structure;

providing an access point with access to said computer usable password policy data structure;

receiving feedback from a password policy enforcement agent associated with said access point about which of said plurality of password policies have been successfully enforced;

determining a strength of one of said plurality of password policies based on said feedback; and dynamically modifying one of said plurality of password policies based on said strength.

21. The computer usable storage device of claim 20 wherein said computer usable password policy data structure comprises a file structure compatible with extensible markup language.

22. The computer usable storage device of claim 20 wherein said method further comprises:

selecting a computer access password policy parameter from said plurality of computer access password policy parameters consisting of a parameter selected from a group of parameters comprising a threshold parameter for unsuccessful access attempts that when exceeded disables a computer system access account, a parameter indicating a time duration within which said threshold parameter number of unsuccessful access attempts triggers locking of a computer system access account, an initial delay parameter to block access to a computer system access account for a period of time after an unsuccessful access attempt, a minimum password length parameter, a maximum password length parameter, a parameter to prohibit passwords consisting of a natural language word, a parameter to prohibit passwords consisting of a palindrome, a parameter to prohibit passwords consisting of a derivative of a computer system account name, a parameter to automatically generate a password, a parameter to automatically generate a pronounceable password consistent with all of said plurality of password policies, and a parameter to specify a set of characters utilizable to automatically generate a password.

\* \* \* \* \*